No. 680,137. Patented Aug. 6, 1901.
J. FELLOWS.
SHARPENING DEVICE FOR FOOD SLICERS OR CUTTERS.
(Application filed Dec. 8, 1899.)
(No Model.) 2 Sheets—Sheet 1.
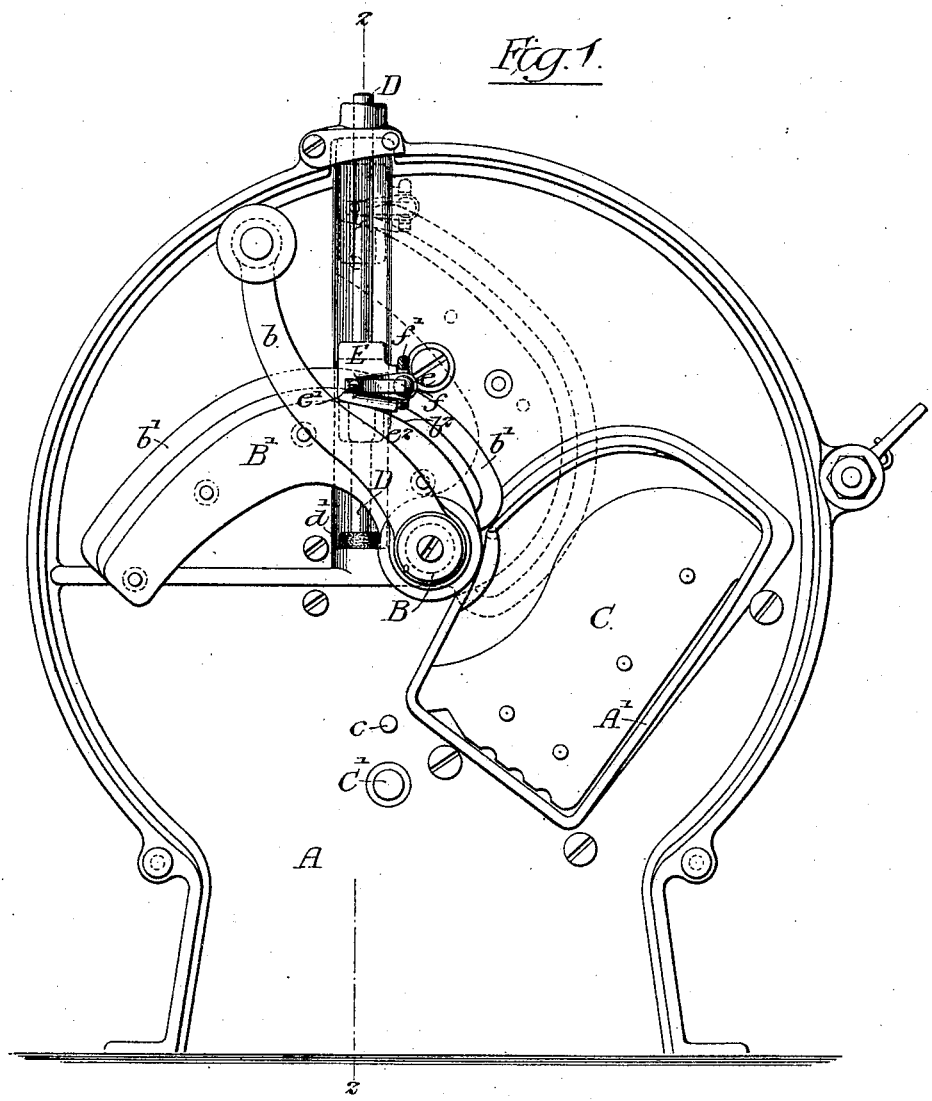
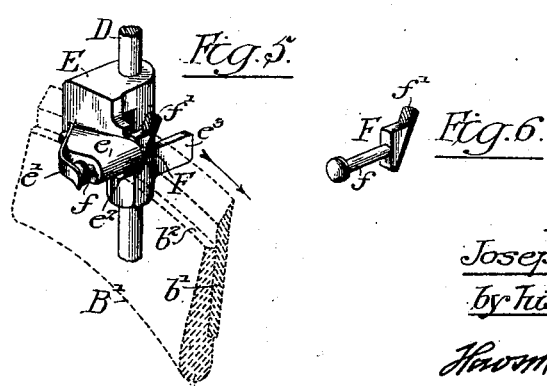
Witnesses:-
Louis M. T. Whitehead.
Will. A. Barr.
Inventor:
Joseph Fellows.
by his Attorneys
Howson & Howson
THE NORRIS PETERS CO., PHOTO-LITHO., WASHINGTON, D. C.

No. 680,137. Patented Aug. 6, 1901.
J. FELLOWS.
SHARPENING DEVICE FOR FOOD SLICERS OR CUTTERS.
(Application filed Dec. 8, 1899.)
(No Model.) 2 Sheets—Sheet 2.
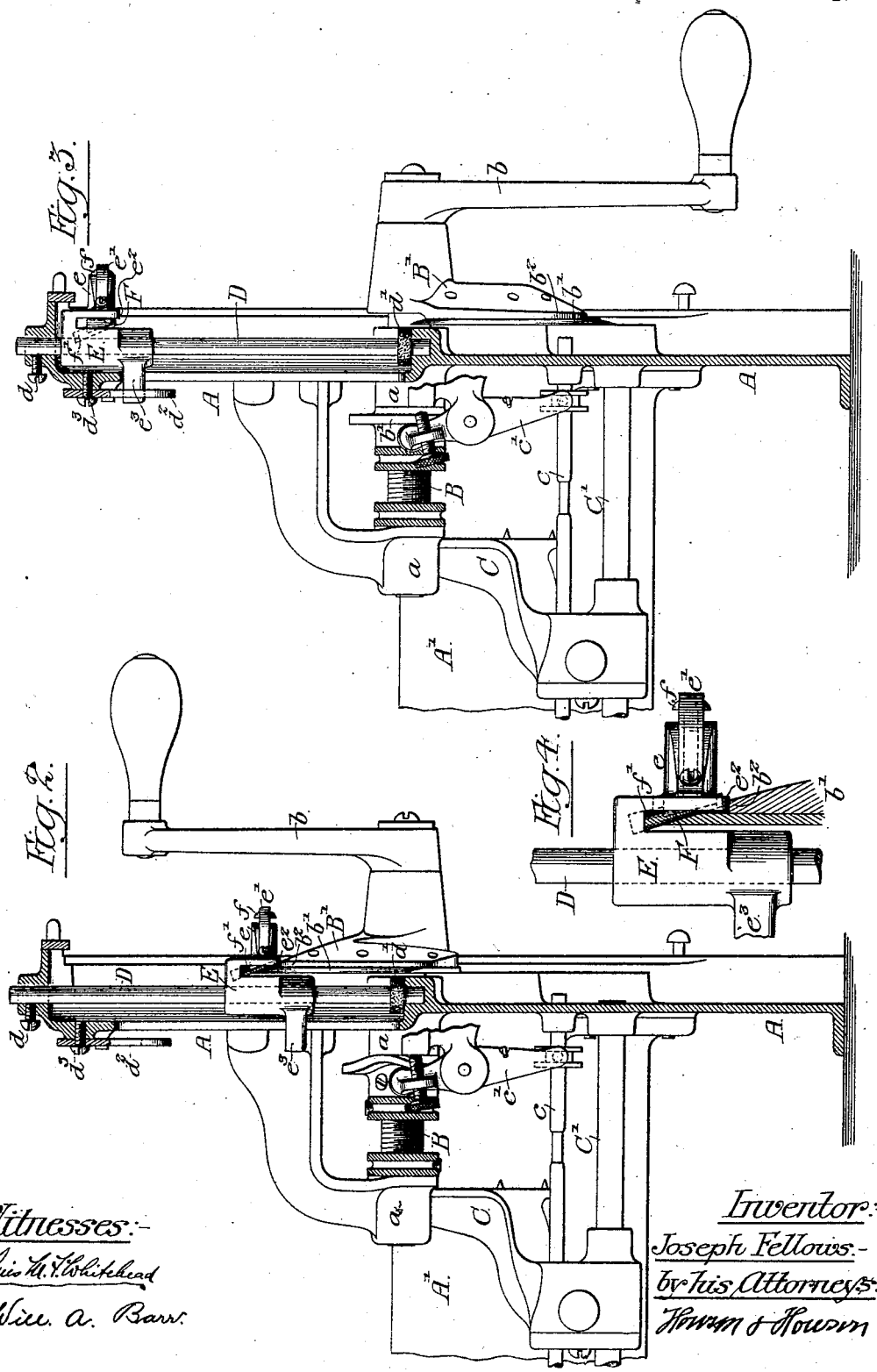
Witnesses:—
Louis M. T. Whitehead
Will. A. Barr.
Inventor:—
Joseph Fellows.
by his Attorneys:
Howson & Howson

UNITED STATES PATENT OFFICE.

JOSEPH FELLOWS, OF PHILADELPHIA, PENNSYLVANIA.

SHARPENING DEVICE FOR FOOD SLICERS OR CUTTERS.

SPECIFICATION forming part of Letters Patent No. 680,137, dated August 6, 1901.

Application filed December 8, 1899. Serial No. 739,698. (No model.)

*To all whom it may concern:*

Be it known that I, JOSEPH FELLOWS, a citizen of the United States, residing in Philadelphia, Pennsylvania, have invented certain Improvements in Sharpening Devices for Food Slicers or Cutters, of which the following is a specification.

The object of my invention is to provide means for sharpening the blades of machines for slicing or shaving food.

In the accompanying drawings, Figure 1 is a face view of a food-slicing machine with the cap removed, illustrating my invention, the sharpening device being in position to sharpen the knife. Fig. 2 is a sectional view on the line 2 2, Fig. 1. Fig. 3 is a view similar to Fig. 2 of the sharpening device out of gear. Fig. 4 is an enlarged view of a portion of Fig. 2, and Figs. 5 and 6 are views of details of the sharpening device.

A is the frame of the machine.

A' is a trough on which the material is fed to the cutter.

B is the shaft, having a handle $b$, and this shaft is adapted to bearings $a\,a$ on the frame of the machine, and on the shaft is a carrier B', having a blade $b'$, which form a movable knife structure. The knife as the shaft is revolved passes across the end of the trough and slices or shaves the food as it is projected from the trough.

The food is fed in the present instance by a pusher C, guided on the shaft C' and fed intermittently forward by a friction-rod $c$ engaging a lever $c'$, pivoted to the frame and actuated by a cam $b'$ on the shaft B. This particular mechanism is fully described and claimed in an application for patent filed by me December 7, 1899.

My present invention relates simply to the means for sharpening the knife of a food cutter or slicer.

It is very difficult to sharpen the knife of a rotary or reciprocating food-cutter while in the machine, and the general practice has been to remove the knife from the machine and sharpen it with a stone or other sharpening device; but by my invention I am enabled to sharpen the knife without dismantling the machine and by simply throwing the sharpened mechanism into action.

Secured to the frame A of the machine is a rod D, in the present instance mounted in bearings at top and bottom and secured by a set-screw $d$. On the rod D is a slide E, adapted to straddle the knife-blade $b'$, as clearly shown in Figs. 2 and 4, and adapted to a bearing on this slide is the sharpener F, Fig. 6. The sharpener has a shank $f$ adapted to a bearing $e$ on the slide E, and pressing against the end of the shank is a spring $e'$. On the end of the sharpener F is secured a single piece of roughened steel $f'$, which is set at the same angle as the taper of the knife-blade. The portion $e^2$ of the slide E rests upon a portion $b^2$ of the knife-carrier B', as clearly shown in Figs. 1 and 4. Thus the slide is guided not by the knife-blade, but by the portion $b^2$ to which the knife-blade is secured and insuring the sharpening of the entire cutting portion of the blade without undue pressure at any one point.

When the sharpener is in position to sharpen the blade, as shown in Fig. 2, it simply rests upon the portion $b^2$ of the blade-carrier as the blade revolves, the extreme elevation being shown by dotted lines in Fig. 1. By this form of sharpener I am enabled to sharpen the entire cutting-surface of the knife, the sharpener readily adapting itself to the peculiar curve of the knife.

$d'$ is a washer of yielding material, which is mounted on the rod D at the base of the recess in the frame A, in which the sharpener rests. This washer acts as a cushion for the sharpener when it falls from the elevated position (shown by dotted lines in Fig. 1) when disengaged by the knife.

On the rear of the slide E is a projection $e^3$, with which engages a latch $d^2$, pivoted at $d^3$ to the frame, so that the sharpener can be elevated and locked out of engagement with the blade, as it will be understood that the blade would rapidly wear away if the sharpener was constantly in engagement with it.

I claim as my invention—

1. The combination in a food cutter or slicer, of a movable knife structure with a sharpening device for acting upon the blade of said knife, and a guide for said sharpening device so disposed that the latter will be caused to move on said guide by reason of its contact with the moving knife structure, substantially as described.

2. The combination in a food cutter or slicer, of a movable knife structure, a sharpening device consisting of a sharpener for acting on the blade of the knife, a carrier for said sharpener, a guide for said sharpener so disposed that the latter will be moved on said guide by contact with the knife structure, and means for mounting the sharpener on said carrier so that it can have transverse movement independently thereof, substantially as described.

3. The combination of a frame, a shaft, means for rotating the shaft, a blade-carrier on said shaft, a blade thereon, a fixed rod, a slide mounted on the fixed rod, and a sharpening device carried thereby, the said slide being raised by the knife structure as it is rotated, causing the sharpener to pass over the blade, substantially as described.

4. The combination of a frame, a shaft mounted thereon, a curved blade-carrier mounted on the shaft, a curved blade carried thereby, a rod on the frame, a slide mounted on the rod, and adapted to be engaged by the curved surface of the knife structure, and a sharpener adapted to the said slide and bearing against the blade, substantially as described.

5. The combination of a frame, a shaft, means for rotating the shaft, a blade-carrier on said shaft, a blade thereon, a fixed rod, a slide mounted on said fixed rod, a sharpener carried thereby, a roughened steel piece on the sharpener set at the same angle as the taper of the knife-blade, and means for forcing the sharpener against the blade, the said slide being raised by the knife structure as it is rotated causing the sharpener to pass over the blade, substantially as described.

6. The combination of a frame, a shaft mounted thereon, a curved blade-carrier mounted on the shaft, a curved blade carried thereby, a rod on the frame, a slide mounted on the rod having a portion resting on the blade-carrier, said slide being recessed for the reception of the blade, a sharpener mounted on the slide, and means for causing the sharpener to bear against the beveled edge of the knife-blade, substantially as described.

7. The combination of a frame, a shaft, means for rotating the shaft, a blade-carrier on the said shaft, a blade thereon, a fixed rod on the frame, a slot in the frame back of the rod, a slide mounted on the fixed rod and having a projection entering the slot, and a sharpening device carried by the slide, said slide being actuated by the knife structure as it is rotated causing the sharpener to pass over the blade, substantially as described.

8. The combination of the frame, a shaft, means for rotating the shaft, a knife structure mounted on the shaft consisting of a carrier and a blade, a vertically-arranged rod fixed to the frame, a slide on said rod recessed to receive the blade of the knife structure, a sharpening device mounted on the slide, and means for causing the sharpener to bear against the beveled edge of the blade, substantially as described.

9. The combination of the frame, a shaft, means for rotating the shaft, a knife structure mounted on the shaft consisting of a carrier and a blade, a vertically-arranged rod fixed to the frame, a slide on said rod recessed to receive the blade of the knife structure, a sharpening device mounted on the slide, means for causing the sharpener to bear against the beveled edge of the blade, and means for retaining the slide in the elevated position clear of the knife-blade, substantially as described.

10. The combination of the frame, a shaft, means for rotating the shaft, a knife structure mounted on the shaft consisting of a carrier and a blade, a vertically-arranged rod fixed to the frame, a slide on said rod recessed to receive the blade of the knife structure, a sharpening device mounted on the slide, means for causing the sharpener to bear against the beveled edge of the blade, said slide having a projection at the rear passing through a slot in the casing, and a latch engaging the projection to hold the slide clear of the knife structure, substantially as described.

In testimony whereof I have signed my name to this specification in the presence of two subscribing witnesses.

JOSEPH FELLOWS.

Witnesses:
WILL A. BARR,
JOS. H. KLEIN.